Aug. 28, 1962 R. W. GILBERT 3,051,939

ANALOG-TO-DIGITAL CONVERTER

Filed May 8, 1957 2 Sheets-Sheet 1

ROSWELL W. GILBERT
INVENTOR.

BY Rudolph J. Jusick
ATTORNEY

Aug. 28, 1962 R. W. GILBERT 3,051,939

ANALOG-TO-DIGITAL CONVERTER

Filed May 8, 1957 2 Sheets-Sheet 2

ROSWELL W. GILBERT
INVENTOR.

BY Rudolph J. Jusick
ATTORNEY

United States Patent Office 3,051,939
Patented Aug. 28, 1962

3,051,939
ANALOG-TO-DIGITAL CONVERTER

Roswell W. Gilbert, Montclair, N.J., assignor, by mesne assignments, to Daystrom, Incorporated, Murray Hill, N.J., a corporation of Texas Filed May 8, 1957, Ser. No. 657,874
20 Claims. (Cl. 340—347)

Figure 1:
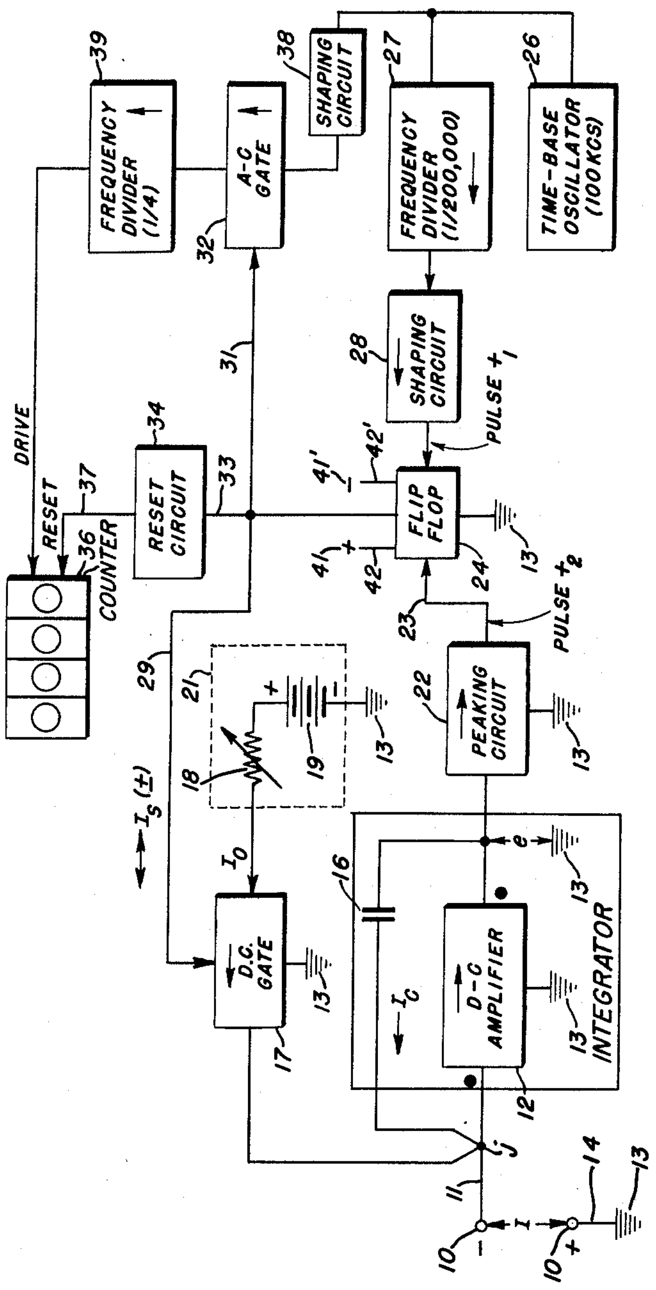

This invention relates to an electronic converter system and more particularly to an analog-to-digital converter for converting an analog input current or voltage into digital form.

Conventionally, digitizing systems function by periodically sampling the analog input instantaneously, without knowledge of the analog level between the instantaneous sampling events. If the analog input is undergoing dynamic change, the resulting digital output is uncertain to a degree approaching the amount of the change. Systems of this type are, therefore, restricted to substantially steady-state input conditions, and are not applicable to fast process control or computation procedures. In contrast, the analog-digital converter of my invention functions by continuous integration of the input against time, and periodic division of the integral by time. Thereby all components of the input, transient or steady-state, are included, and dynamic variations are acceptable. Further, the accumulated digital output, as by adding the output figures continuously, is the true continuing time-integral of the input.

Many contemporary analog-to-digital converter systems employ slide wires or matrix-switched networks; which are undesirable mechanically, are expensive and/or are limiting to accuracy. My novel system, on the other hand, is entirely electronic, and involves no contacts or other active mechanical elements subject to wear. It is, therefore, particularly suited to continuous operation, with a reliability expectancy appropriate to critical industrial and computer service. Further, the resolving power of the system is about 1 part in 10,000, and the permanent accuracy about 0.1 percent of the range. The input may be a current or a voltage having a normal range of 0–1 milliampere or 50 millivolts, respectively. The output may be derived from electronic scalers, or a digital counter, and may be arranged to drive subsequent system components including tape and card machines, typewriters, digital recorders, digital computers, and the like. The analog-to-digital converter of my invention effects the conversion of an analog input current by time-ratio function. The converter comprises a standardized reference current which is connected to a current summing junction through an analog gate. The standardized reference current is of opposite polarity to the analog input current, which input current is also connected to the current summing junction. The combined analog input current and gated standardized reference at the current summing junction is connected to the input of an integrator. The integrator may comprise, for example, a D.-C. amplifier having a capacitor feedback circuit connected between the amplifier output and input circuits, such device being known as a "Miller" integrator, as is understood by those skilled in this art. The output from the integrator is connected to the analog gate through suitable circuit means for actuation of the gate to a closed condition at a predetermined level of time integral output from the integrator. A time-base oscillator, or clock source is connected to the analog gate through a frequency dividing network for actuation of the gate to an open position at predetermined and consistent time intervals. Thus, it will be understood, that the analog gate is opened periodically by the clock pulse source, and closed at a consistent predetermined level of time integral output from the integrator. The ratio of the time during which the analog gate is open to the time of a complete operating cycle during which the gate is both open and closed, is a measure of the analog input current to the device. The system includes a feedback loop wherein the gate open time is sufficient to balance the currents at the current summing junction.

The said clock pulse source is also fed to the input of a pulse gate through a second frequency dividing network. The pulse gate is actuated to opened and closed positions by the same actuating signal which is applied to the analog gate, whereby the number of pulses passing through the pulse gate is a measure of the analog input to the device.

In simplest terms, the converter of my invention includes means whereby a standardized reference is time divided to balance against an analog input, thereby developing a time-ratio function expressive of the analog input. The time-ratio function is then applied to switch a time-base oscillator, or clock pulse source, which is scaled to provide a digital output. The system is balanced by a process of feedback integration, and the response is the average of the time analog input over the digitizing period. This powerfully rejects spurious input noise and hum in a fashion equivalent to a completely ideal filter having no carry-over.

An object of this invention is the provision of an encoding device for converting an analog input into digital form.

An object of this invention is the provision of an analog-to-digital converter designed to receive an analog current, or voltage, and present the level in recurrent digitized form.

An object of this invention is the provision of an analog-to-digital converter which functions by continuous integration of the input against time and periodic division of the integral by time, whereby all components of the input, transient or steady-state, are included, and dynamic variations are acceptable.

An object of this invention is the provision of an analog-to digitial converter for converting an analog input into digital form, comprising: an oscillator; an A.-C. gate; an electronic scaler; means connecting the output of said oscillator to the said scaler through the said A.-C. gate for drive actuation of the said scaler; an analog integrator having an input and output circuit; an analog reference source; a D.-C. analog gate connected between the said reference source and the input circuit of the said analog integrator, the said analog integrator being responsive to the algebraic sum of the said analog input and gated analog reference source; means connecting the integral from the said analog integrator to the said D.-C. analog gate and to the said A.-C. gate whereby the said gates are actuated in one direction in response to a predetermined level of the said integral; and means actuating the said D.-C. analog gate and the said A.-C. gate in the other direction at predetermined and constant time intervals.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

Figure 2:
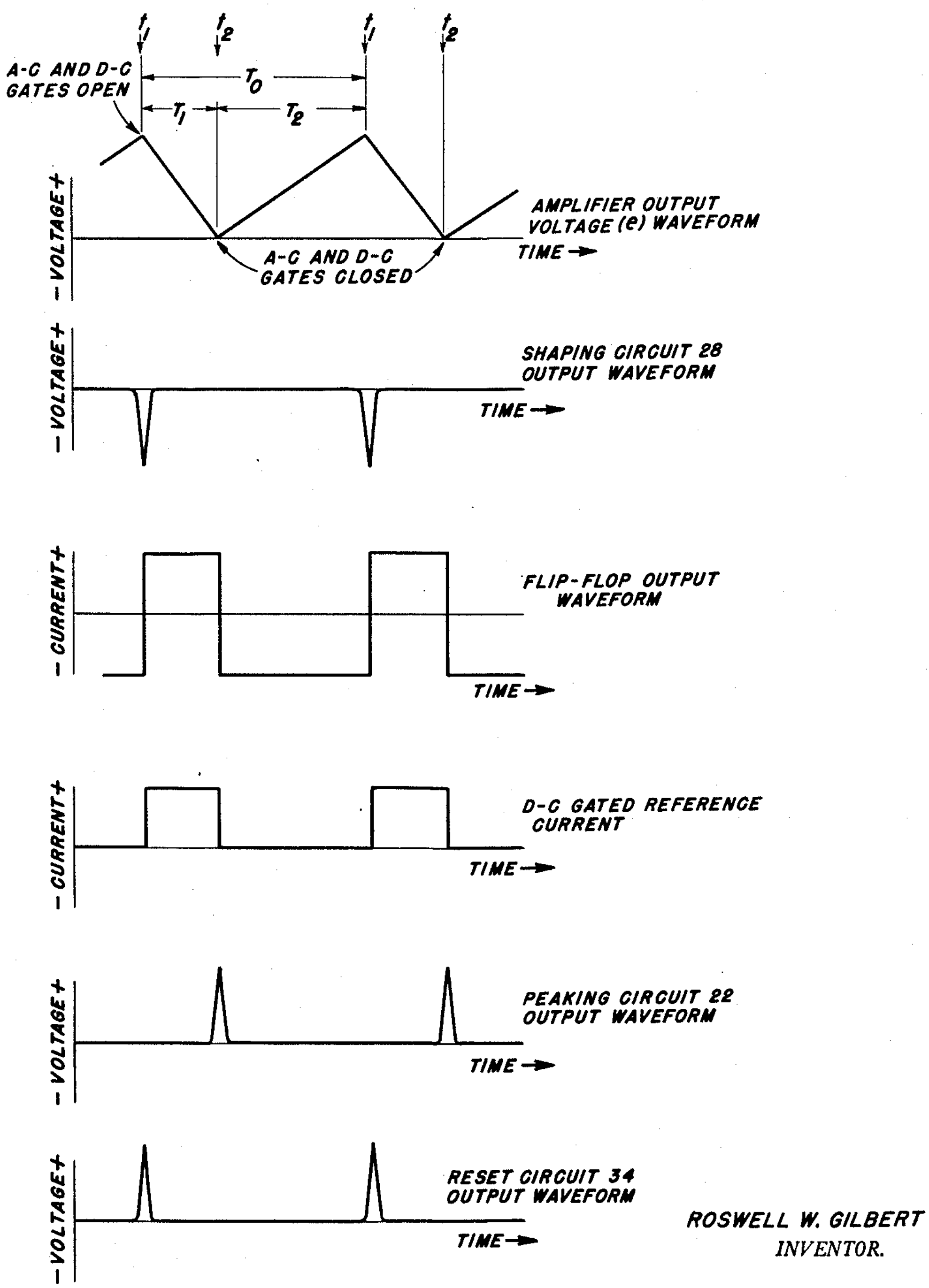

In the drawings wherein like reference characters denote like parts in the several views:

FIGURE 1 is a diagrammatic presentation of one form of my novel analog-to-digital converter system; and FIGURE 2 are curves illustrating various typical waveforms produced in the apparatus of FIGURE 1.

Reference is now made to FIGURE 1 of the drawings wherein there is shown a diagrammatical presentation of an analog-to-digital converter which is adapted for use in translating a current input analog magnitude, designated I, into recurrent digitized form. (With simple circuit modifications, within the capabilities of those skilled in this art, the converter apparatus may be adapted to translate a potential input analog magnitude into digital form.) The input current I is applied to a pair of input terminals 10, 10. One of the input terminals 10 is connected through a lead wire 11 to a D.-C. amplifier 12, while the other terminal is connected directly to a common ground connection, designated 13, through a lead wire 14. The D.-C. amplifier 12 is provided with two feedback circuits; one being an A.-C. conductive circuit which includes a capacitor 16 connected directly between the D.-C. amplifier output and input circuits, and the other a D.-C. feedback circuit.

It will be understood that any of the conventional type D.-C. amplifiers may be used for the D.-C. amplifier 12. A D.-C. amplifier of the type described in my United States Patent No. 2,744,168, entitled D.-C. Amplifier, and issued May 1, 1956, is particularly adapted for use in the novel converter apparatus of my invention. The established resolution of this amplifier is five (5) microvolts and 0.1 microamperes with a relating match resistance of fifty (50) ohms. In the current-input case, the output range is one (1) milliampere, which gives a resolution ratio of 1 part in 10,000.

A D.-C. feedback current, designated $I_0$, is connected to the D.-C. amplifier input circuit through a D.-C. analog gating circuit 17. A variable resistor 18 and a source of D.-C. current 19 comprise a source of standardized reference current, designated 21, the magnitude of the said reference current $I_0$ being adjustable to a predetermined value by the variable resistor 18.

The D.-C. amplifier output circuit includes a peaking circuit 22. As described below, in the detailed description of the operation of the system, the D.-C. amplifier output potential, designated *e*, is in the general form of a sawtoothed oscillation. The peaking circuit 22 is actuated by the negative-going portion of the sawtooth waveform *e*, and produces a large magnitude trigger pulse of one polarity. The trigger pulse is connected through a lead wire 23 to a "flip-flop," or Eccles-Jordan, circuit 24. The "flip-flop" circuit 24 is bistable and is driven into one of its two stable conditions by the trigger pulse from the peaking circuit 22.

Trigger pulses of the opposite polarity, for driving the flip-flop circuit 24 into its other stable condition, are supplied by a time-base oscillator 26 through a frequency divider 27 and a shaping circuit 28. It will be understood that with a relatively stable time-base oscillator 26, the pulses from the shaping circuit 28, which pulses are designated pulse $t_1$, occur at predetermined and constant spaced-time intervals. The pulses from the peaking circuit 22, which pulses are designated pulse $t_2$, on the other hand, are produced at a constant predetermined level of D.-C. amplifier output potential *e*.

The peaking circuit 22 and flip-flop circuit 24 may be of any conventional design. A conventional peaking circuit, for example, includes a high-mu triode tube which responds sharply when the grid bias swings into, or out of, the negative region. The peaking circuit 22 is initiated by the arrival of the negative-going D.-C. amplifier output voltage (*e*) at a consistent cut-off level. The cut-off level is, in part, determined by conductively applying the D.-C. amplifier output (*e*) to the high-mu triode tube of the peaking circuit. When the grid of the peaking tube swings into the negative region, a sharp positive-going pulse appears at the plate of the triode tube. The pulse may be further sharpened by a Zener diode having a Zener potential of approximately 150 volts and coupling the plate of the triode tube to the grid of one of the tubes in the flip-flop circuit, for example. The Zener diode is normally blocked when the plate potential is low, and conducts when the rising plate potential reaches about 150 volts positive with respect to the cathode. When the grid jumps positive, the flip-flop circuit is driven to the fallover point reducing the diode voltage below the Zener potential and decoupling the flip-flop from the peaking circuit.

The rise and fall of the sawtooth potential (*e*) is relatively slow. The initiation of a trigger pulse by the peaking circuit 22 is determined at a potential which is consistently similar upon successive cycles of operation. For this reason, the peaking circuit must be conductively coupled to the flip-flop circuit as described above. The Zener diode serves this purpose; and further, the diode decouples the peaking circuit from the flip-flop circuit during the greater portion of the cycle leaving the flip-flop circuit free to respond to the next trigger pulse from the shaping circuit 28.

The flip-flop circuit 24, as mentioned above, is a bistable multivibrator having two stable limiting conditions into which the circuit is alternatively triggered by the trigger pulses from the peaking circuit 22 and the shaping circuit 28. One simple, conventional, form of flip-flop circuit comprises two triode tubes in which the grid of the first tube is coupled to the anode of the second tube through a network consisting of a parallel connected resistor and capacitor, and the grid of the second tube is similarly coupled to the anode of the first tube through an identical coupling network. This basic circuit is bistable; one condition exists when the first tube is conducting and the second is cut off, and another condition exists when the second tube is conducting and the first is cut off. The circuit remains in one or the other of these two conditions with no change in the plate, grid, or cathode potentials, or plate current, until triggered by a trigger pulse from one of the peaking circuits. The tubes then reverse their functions and remain in the new condition as long as plate current flows in the conducting tube. The output from the flip-flop circuit is thereby a step function having a square waveform which is alternatively positive and negative. (As seen in FIGURE 1, the flip-flop 24 is connected to a source of positive and negative voltage 41 and 41′ through lead wires 42 and 42′, respectively, whereby the square wave may assume alternate positive and negative polarities, as will be understood by those skilled in this art.) Other well known flip-flop circuits utilize saturable reactors or transistors, and may be used in my novel converter apparatus.

The time-base oscillator 26 is of any conventional design. A crystal controlled oscillator is satisfactory, and typically operates at 100 kcs. The system is, however, not critical toward the absolute frequency, but requires only that the frequency be constant between successive cycles of operation. The crystal oscillator is desirable for transient stability; no temperature compensation or other elements being necessary, or normally included, for absolute long-period stability.

The frequency divider 27 may comprise a phantasatron system for producing two-base pulses at predetermined and constant time intervals. The system may include six stages of frequency division; four of the stages having a division of 10, one of 5 and another of 4. The total overall division is 200,000, to divide the base frequency of 100 kcs. to 0.5 c.p.s., or a time base period, designated $T_0$, of 2 seconds.

The output of the frequency divider 27 is a rectangular-shaped waveform, with a negative-going edge at time $t_1$, and a positive-going return edge that is later rejected by the shaping circuit 28. The shaping circuit 28 typically includes a series-capacitor shunt-resistor circuit for differentiating the pulses from the frequency divider 27. The pulses may then be amplified by a first time-base pulse amplifier, and further amplified by a second time-base pulse amplifier; the unwanted pulse corresponding to the positive-going edge of the original frequency divider output waveform being rejected by a diode in the input circuit to the second amplifier stage. The fully amplified time-base pulse is now negative, and is applied to the grid of one of the tubes in the flip-flop circuit 24 for actuation of the flip-flop into one stable state every two (2) seconds.

The square waveforms of alternative positive and negative polarity steps from the flip-flop 24 are connected through a lead wire 29 to the D.C. analog gating circuit 17, and through a lead wire 31 to an A.C. gate circuit 32; the square waveform from the flip-flop 24 controlling the opening and closing of both the D.C. and A.C. gates 17 and 32, respectively. Further, the flip-flop output is connected through a lead wire 33 to a counter reset circuit 34, which, in turn, is connected to an electronic counter 36 through a lead wire 37. The counter 36 is reset by pulses from the reset circuit 34.

The square-wave current from the flip-flop 24 which controls the opening and closing of the D.C. gate 17 is designated $I_s$. The D.C. gate, as mentioned above, serves to switch the reference current $I_0$ to the input circuit of the D.C. amplifier during a time period designated $T_1$, and to by-pass the reference current to the common ground 13 during a time period designated $T_2$. While my invention is not limited to any particular D.C. gate circuit, it will be understood that the gate must perform its switching functions clearly in response to a switching current that is variable within relatively wide limits, as the switching current $I_s$, which is derived from the flip-flop 24, varies over wide limits. Further, the D.C. gate must maintain the integrity of the reference current $I_0$ when open, and not leak appreciably when closed. A D.C. gate which is particularly adapted for use in my novel converter apparatus, is disclosed in my copending patent application entitled D.C. Gating Circuit, Serial No. 657,911, and filed May 8, 1957, now Pat. No. 2,959,689.

The D.C. gate described therein employs diodes having a high reverse resistance characteristic. With such a gate, the reference current $I_0$, which is positive and has a normal level of 5 milliamperes, is gated through the D.C. gate by a switching current $I_s$ that is positive and theoretically anything greater than zero, and gated to ground by a negative switching current that is theoretically at least greater than the positive reference current. With a gate of this type, the integrity of the reference current and gate leakage is better than 1 part in 10,000 and, in effect, the gate functions as a relay having a speed of a few microseconds.

The time-base oscillator 26, in addition to supplying a periodic trigger pulse to the flip-flop 24, through the frequency divider 27 and shaping circuit 28, is connected through a shaping circuit 38 to the A.C. gate 32, through the gate 32 to a frequency divider 39, and thence to the counter 36, such that, when the A.C. gate is open, the counter 36 is driven by the signal originating with the time-base oscillator.

The shaping circuit 38 and A.C. gate 32 employ conventional circuits and techniques and, therefore, are not described in detail. The output of the time-base oscillator 26 is of sinusoidal form having a frequency of 100 kcs. The shaping circuit may include a cathode coupled flip-flop circuit having circuit parameters designed to shape the signal for subsequent injection into the counter 36. The shaped output of the shaping circuit 38 is connected to the A. C. gate, which is gated open during the time period $T_1$ by a positive signal from the flip-flop 24. (During the time period $T_2$, the negative signal from the flip-flop 24 closes the A.C. gate 32, thereby preventing the shaped output from the shaping circuit to pass therethrough to the counter 36.) The A.C. gate may simply comprise a tube which is blocked by a negative signal from the flip-flop 24, and is conductive with a positive signal therefrom.

The counter 36, reset circuit 34 and frequency divider 39 are also of conventional design. In a typical decimal arrangement the counter 36 comprises four (4) decimal units and presents a four-digit output, 0000 to 9999. The counter units may be standard electronic feedback binary devices arranged for positive pulse zero reset. Further, the counter units may be adapted to supply a staircase output voltage for operation of digital accessory devices, if desired, as will be well understood by those skilled in this art.

In the typical arrangement illustrated in FIGURE 1, the frequency divider 39, which precedes the counter 36, divides the gated pulse output from the A.-C. gate 32, by 4. The frequency divider 39 may comprise a simple 2-binary-state circuit without reset or readout provisions. After division, the pulse frequency is 100,000/4 or 25,000 p.p.s. The counter range of 10,000 then corresponds to a maximum count time ($T_1$) of 0.4 second for full scale input.

The reset circuit 34 functions to shape the output from the flip-flop for use in resetting the counter 36. The reset circuit is arranged to reset the counter units at the beginning of the $T_1$ period at time $t_1$. The reset operation precedes the counting process, which starts almost simultaneously therewith; both the reset circuit and A.-C. gate being actuated by the same square-wave signal from the flip-flop. The reset circuit 34 supplies a positive pulse to the counter units for resetting the same.

Illustrations of typical waveform which are present at various points in the system of FIGURE 1 are shown in FIGURE 2. Assuming, for purposes of illustration and explanation of the operation of the system, that the input current I is a constant value of the polarity illustrated in FIGURE 1, and the system has reached a steady-state condition. The analog input current I is connected to the input terminals 10, 10 and thus applied to a circuit junction, designated (*j*), as a point of current balance. The input current I is balanced continuously by the current through the capacitor 16, which current is designated $I_c$, and periodically by the reference current $I_0$ which is introduced into the junction when the analog gate 17 is open. The balance equation at the junction (*j*) is thereby:

$$I+I_c+I_0\left[\frac{T_1}{T_1+T_2}\right]=0 \qquad (1)$$

wherein $T_1$ is the time-period when the reference current $I_0$ is gated into the junction (*j*), and $T_2$ is the time-period when the D.-C. gate is closed and the reference current is bypassed to ground. The D.-C. amplifier 12 has a dimension of negative transfer resistance which essentially, and ideally, is infinite. Upon application of an input current I to the analog-to-digital converter, feedback will be satisfied by current $I_c$ flowing through the capacitor 16 in response to a changing potential, designated *e*, at the amplifier output circuit. This is a conventional integrating arrangement, and;

$$e=\left(\frac{1}{C}\right)\int I_c dt \qquad (2)$$

or, $$I_c=C(de/dt) \qquad (3)$$

wherein C is the capacity of the capacitor 16. With a negative input current I, the amplifier output is positive-going. The peaking circuit 22, as mentioned above, is responsive to negative-going, but not to positive-going amplifier output potential *e*. At time $t_1$, however, the timebase oscillator 26 (typically a 100 kcs. oscillator) operating through the frequency divider 27 and shaping circuit 28, supplies a negative trigger pulse to the bistable flip-flop circuit 24, causing the circuit to assume one of the two stable operating conditions. As seen in FIGURE 2, the negative trigger pulse from the shaping circuit 28 results in a positive current output from the flip-flop. The positive flip-flop output current is of a sufficient magnitude to open the D.-C. gate 17 and A.-C. gate 32. When the D.-C. gate is open, the positive D.-C. gate output current (that is, the reference current $I_0$) is fed through the D.-C. analog gating circuit to the amplifier input circuit. The reference current $I_o$, being of greater magnitude than the input current I, and of opposite polarity thereto, drives the D.-C. amplifier such that the amplifier output voltage $e$ goes in the negative direction. When the negative-going voltage $e$ reaches a consistent, predetermined, level, the peaking circuit 22 functions to produce a positive trigger pulse, as seen in FIGURE 2. This trigger pulse is fed through the lead wire 23 to the bistable flip-flop circuit 24 causing the circuit to assume the other stable operating condition. The flip-flop output current, as seen in FIGURE 2, then goes negative. The negative flip-flop current is of sufficient magnitude to close the D.-C. gate 17 and A.-C. gate 32. The D.-C. analog gate thus closed, stops the flow of reference current $I_o$ to the D.-C. amplifier input. The negative flip-flop output current obtains until the flip-flop is again triggered by a negative time-base pulse $t_1$ from the shaping circuit 28. The entire cycle then repeats in the above-described manner. It will be noted that the repetition period $T_o$ is fixed by the time-base oscillator 26.

The circuit junction ($j$) is thereby current balanced against the input current I by the reactive current $I_c$ through the capacitor 16 and the periodic application of reference current $I_o$. The capacitor 16, however, cannot carry D.-C. components in continuing time, and so, the capacitor current $I_c$ need not be included in the balance Equation 1, therefore, in time, the Equation 1 may be expressed as;

$$I+I_o\left[\frac{T_1}{T_1+T_2}\right]=0 \qquad (4)$$

or, $$I=-I_o\left(\frac{T_1}{T_1+T_2}\right)=-I_o\left(\frac{T_1}{T_o}\right) \qquad (5)$$

During the time $T_1$, the A.-C. gate is also opened by the positive flip-flop output. The shaped pulses from the shaping circuit 38 (occurring at a rate of 100,000 p.p.s.) are conducted through the A.-C. gate to the frequency divider 39. After a frequency division of four by the frequency divider 39, the pulses actuate the counter 36.

From Equation 5, it will be seen that the time-periods $T_0$, $T_1$ and $T_2$ are expressable in terms of number of oscillation of the time-base oscillator, $N_0$, $N_1$ and $N_2$, respectively, with $N_0$ being the divisor of the frequency divider 27 as a constant. Equation 5 may, therefore, be stated as;

$$I=N_1(-I_0/N_0) \qquad (6)$$

wherein the bracketed term is the calibration constant of the system, and the count of $N_1$ is the digitized readout.

The reset circuit 34 is actuated by the positive going portion of the flip-flop 24 output, and produces a positive pulse at time $t_1$ which is connected to the counter units, resetting the same. The reset operation precedes the counting process, which starts almost immediately thereafter.

Performance of the system may be analyzed in terms of three primary areas: resolution or sensibility, stability, and transient behavior. These factors add to determine the overall accuracy expectancy for various operating conditions and states of adjustment.

The digital resolving power is essentially that of the counter 36; and may be, for example, 1/10,000 for 4-digit presentation in decimal form. The A.-C. gate and gate drive circuits operate within one cycle of the time-base frequency 100 kcs., over a period of 0.4 second, or 1/40,000 so the gate resolution is not a limiting factor.

The analog resolving power is essentially the sensibility of the D.-C. amplifier 12. As mentioned above, this is stated as 1/10,000 when the input circuit is on the favorable side of a 50-ohm match resistance..

The integrity of the diode gate is considered as equivalent to a diode leakage of 0.01 microampere maximum, which is typical of good diffused junction silicon diodes at low reverse voltages. The loss of analog resolution in the gate is thereby about 1/100,000, and is negligible relative to the resolution of the D.-C. amplifier.

The overall resolution is the sum of the analog and digital resolution, and is about 1/5000.

Stability may be defined, in the case, as the range of digital uncertainty, either instantaneous or with continuing time, when the input analog level is absolutely steady. It thus is distinguished from transient response which expresses the added effect due to variation of the input level.

The long-term stability is, essentially, that of the standardized reference current source 21. A typical source has a drift expectancy, after warm-up, of about 1/100,000 hour, maximum, which is about 0.1 percent in 100 operation hours.

Short term stability is the uncertainty of digital readout from cycle, to cycle, and is the result of transient disturbances from the power supply line, hum, noise, tube microphonics, and such. The system depends upon exact repetition of operating cycles, particularly the exact initiation of the cut-off pulse $t_2$. If the supply voltages or the circuit parameters vary from cycle to cycle, the digital output will become uncertain because of advance or retard of the cut-off pulse.

The transient stability of the time-base oscillator 26 in determining the consecutive length of the time-base periods is likewise a theoretical contribution to short-term instability. However, the crystal oscillator is relatively excellent in this respect.

The limiting quality determining short-term stability is regulation of the D.-C. supply voltages for the system, in terms of rate-of-drift. The effect is something less than direct in that a change in supply voltage will cause something less than an equivalent uncertainty of digital output, but it is nonetheless critical. The efficiency of a typical dynamically regulated voltage supply may be better than 1/5,000 over the 2-second time-base period, including a 10 percent line voltage change, and the short-term stability will be somewhat better than this figure.

Having now described my invention in detail, in accordance with the patent statutes, various changes and modifications will suggest themselves to those skilled in this art. For example, the switching sequence may be reversed by having the trigger pulse from the peaking circuit 22 start the $t_1$ period rather than the $t_2$ period. It is intended that this, and other such changes and modifications, shall fall within the spirit and scope of the invention as recited in the following claims.

I claim:

1. A converter system for converting an analog input of one polarity into recurrent digitized form, comprising: a source of periodic pulses; a pulse gating means, the said source of periodic pulses being connected to the input thereof; integrating means, the said analog input being connected to the input thereof; an analog reference source of constant magnitude and of a polarity opposite to the analog input polarity; an analog gating means connecting the said analog reference source to the input of the said integrating means; means actuating the said pulse gating means in one direction and simultaneously closing the said analog gating means at a consistent predetermined level of time integral output from the said integrating means; and means including the said source of periodic pulses actuating the said pulse gating means in the other direction and simultaneously opening the said analog gating means at predetermined and consistent time intervals, the output of the integrating means integrating in one direction during the entire time the said analog gating means is open and integrating in the other direction during the entire time the said analog gating means is closed, the ratio of the time during which the said analog gating means is open to a complete operating cycle during which the analog gating means is both open and closed being directly related to the average of the analog input over the operating cycle.

2. The invention as recited in claim 1 including counting means; means connecting the said source of periodic pulses to the said counting means through the said pulse gating means; and means resetting the said counting means at predetermined and consistent time intervals.

3. The invention as recited in claim 1 wherein the said integrating means comprises a D.-C. amplifier and a capacitor connected between the output and input thereof.

4. The invention as recited in claim 1 wherein the said means actuating the pulse gating means in the other direction and simultaneously opening the said analog gating means includes a frequency divider having an input from the said source of periodic pulses.

5. A converter system for converting an analog input into digital form, comprising; an A.-C. gate; an oscillator having an output connected to the said A.-C. gate; an analog integrator having an input and output circuit; an analog gate; an analog reference source of constant magnitude connected to the input circuit of the said analog integrator through the said analog gate, the said analog integrator being responsive to the algebraic sum of the said analog input and gated analog reference source; means connecting the said analog integrator output circuit to the said A.-C. and analog gates for actuation of the A.-C. gate in one direction and simultaneously closing the said analog gate in response to a predetermined level of integral output from the said analog integrator; and means including the said oscillator actuating the said A.-C. gate in the other direction and simultaneously opening the said analog gate at predetermined and constant time intervals, the output of the integrator integrating in one direction during the entire time the said analog gate is open and integrating in the other direction during the entire time the said analog gate is closed, the ratio of the time during which the said analog gate is open to a complete operating cycle during which the analog gate is both open and closed being directly related to the average of the analog input over the operating cycle.

6. The invention as recited in claim 5 including a counter; means connecting the said oscillator to the said counter through the said A.-C. gate circuit for periodic drive actuation of the said counter; and means periodically resetting the said counter at predetermined and constant time intervals.

7. The invention as recited in claim 5 wherein the said analog integrator comprises a D.-C. amplifier and a capacitor connected between the said output and input circuits thereof.

8. The invention as recited in claim 5 wherein the said means actuating the said A.-C. gate in the other direction and simultaneously opening the said analog gate includes a frequency divider having an input from the said source of periodic pulses.

9. A converter system for converting an analog input of one polarity into recurrent digitized form, comprising: a time-base oscillator; pulse gating means; shaping means connecting the said time-base oscillator output to the input of the said pulse gating means; integrating means, the said analog input being connected to the input thereof; a source of reference current of constant magnitude and of a polarity opposite the analog input polarity; analog gating means connecting the said source of reference current to the said integrating means; means actuating the said pulse gating means in one direction and simultaneously closing the said analog gating means at a consistent predetermined level of integral output from the said integrating means; and means connecting the output of the said time-base oscillator to the said pulse and analog gating means for actuation of the A.-C. gate in the other direction and opening the said analog gating means at predetermined and consistent time intervals, the output of the integrating means integrating in one direction during the entire time the said analog gating means is open and integrating in the other direction during the entire time the said analog gating means is closed, the ratio of the time during which the said analog gating means is open to a complete operating cycle during which the analog gating means is both open and closed being directly related to the average of the analog input over the operating cycle.

10. The invention as recited in claim 9 including counting means; means connecting the said pulse gating means output to the said counting means for drive actuation thereof; and means resetting the said counting means at predetermined and constant time intervals.

11. The invention as recited in claim 9 wherein the said integrating means comprises a D.-C. amplifier and a capacitor connected between the output and input thereof.

12. The invention as recited in claim 9 wherein the said means connecting the output of the said time-base oscillator to the said pulse and analog gating means includes a frequency divider.

13. Apparatus for converting an analog input into recurrent digitized form comprising: an integrator having an input and output circuit, the analog input being conductively coupled to the said input circuit; a constant analog reference source of a polarity opposite to the analog input polarity; an analog gating means connecting the said analog reference source to the input circuit of the integrator when the said gating means is open; means responsive to the integrator output for closing the said analog gating means when the output from the integrator reaches a predetermined value; a source of periodically spaced pulses of constant frequency; a frequency divider responsive to the said constant frequency source and time-dividing said periodically spaced pulses to produce a periodic time base pulse; means responsive to the time-base pulse for opening the said analog gating means periodically at predetermined time intervals; a pulse gating means; means connecting the said source of periodically-spaced pulses of constant frequency to the input of the said pulse gating means; and means actuating the said pulse gating means synchronously with operations of the said analog gating means, the number of pulses from the constant frequency source passing through the open pulse gating means being related to the average value of the analog input.

14. The invention as recited in claim 13 including a digital counter responsive to the output from the pulse gating means.

15. A converter system for converting an analog input into digital form, comprising: an A.-C. gate; a time-base oscillator having an output connected to the input of the said A.-C. gate; an analog integrator, the said analog input being connected to the input thereof; an analog gate; an analog reference source connected to the input of the said analog integrator through the said analog gate, the said analog integrator being responsive to the algebraic sum of the said analog input and gated analog reference current; a gate control bistable flip-flop having two inputs and an output circuit; means connecting the output of the said analog integrator to one of the said inputs of the said gate control bistable flip-flop, the said gate control bistable flip-flop being driven into one stable condition in response to a predetermined and consistent level of output from the said analog integrator; a frequency divider connecting the output of the said time-base oscillator to the other of the said inputs of the said gate control bistable flip-flop, the said gate control bistable flip-flop being driven into a second stable condition in response to the periodic output from the said frequency divider; and means connecting the output circuit of the said gate control bistable flip-flop to the said A.-C. gate and analog gate for simultaneously control actuation thereof, the said analog gate being closed at the said predetermined and consistent level of output from the said analog integrator and being opened periodically.

16. The invention as recited in claim 15 including a counter circuit; means connecting the output of the said A.-C. gate to the input of the said counter circuit for periodic drive actuation thereof; and reset circuit means connecting the said output circuit of the gate control bistable flip-flop to the said counter circuit for reset actuation thereof at periodic constant time intervals.

17. The invention as recited in claim 15 wherein the said analog integrator comprises a D.-C. amplifier and a capacitor connected between the output and input circuits thereof.

18. In combination for converting an input signal having an amplitude representing an analog quantity into a plurality of signals digitally representing the quantity, a reactance means for storing energy, means including a charging circuit coupled to said reactance means and adapted to receive said input signal for storing energy in the reactance member at a rate dependent upon the input signal amplitude, a source of reference energy, timing means for providing regularly recurrent timing pulses, means including a discharge circuit coupled to said timing means, to said reactance means and to said source and responsive to said timing pulses for withdrawing energy at a substantially constant rate from said reactance means until a predetermined energy level is reached, and digitizing means coupled to the withdrawing means and to said timing means for producing successive signals during the period of energy withdrawal.

19. In combination for converting an input signal having an amplitude representing an analog quantity into a plurality of signals digitally representing the quantity, integrating means;

a source of periodic timing signals, first electrical circuitry means coupled to the integrating means adapted to receive said input signal for transferring energy into the integrating means at a rate dependent upon the amplitude of said input signal, second electrical circuitry means coupled to said integrating means and to said source and responsive to each of said timing signals for periodically, as a function of time, transferring energy out of the integrating means at a predetermined substantially constant rate, third electrical circuitry means coupled to the integrating means and to said second electrical circuitry means for stopping the transfer of energy out of the integrating means upon the establishment of a particular energy level in the integrating means, and means coupled to said source and to said third means for providing for the passage of repetitive pulses during the transfer of energy out of the integrating means.

20. Apparatus for converting an electrical signal having an amplitude representing information to digital signals representing said information comprising:

a pulse generator means for periodically initiating the generation of a timing pulse at regularly recurring time intervals;

an integrating circuit;

means for applying said electrical signal to said integrating circuit thereby to provide an integrated signal that varies in amplitude as a function of said electrical signal amplitude;

a constant current source;

gate means disposed between said current source and said integrating circuit and responsive to said timing pulse for subtracting current of said current source from said electrical signal, thereby to reduce the magnitude of said integrated signal;

detector circuit means coupled to the output of said integrating circuit and to said pulse generator means for terminating said timing pulse when said integrated signal reaches a predetermined level, whereby the width of said timing pulse is determined by the amplitude of the electrical signal;

and means controlled by the time duration of said timing pulse for producing digital signals indicative of the amplitude of said electrical signal.

References Cited in the file of this patent

UNITED STATES PATENTS

| | | |
|---|---|---|
| 2,560,124 | Mofenson | July 10, 1951 |
| 2,700,501 | An Wang | Jan. 25, 1955 |
| 2,733,358 | Carapellotti | Jan. 31, 1956 |
| 2,885,662 | Hansen | May 5, 1959 |
| 2,941,196 | Raynsford et al. | June 14, 1960 |

OTHER REFERENCES

"Analog to Digital," Electronics, Jan. 1956, S. Rigby, pp. 152–155.